(No Model.)
T. WEAVER & J. F. MAYER.
ICE CREAM FREEZER.
No. 309,177. Patented Dec. 9, 1884.
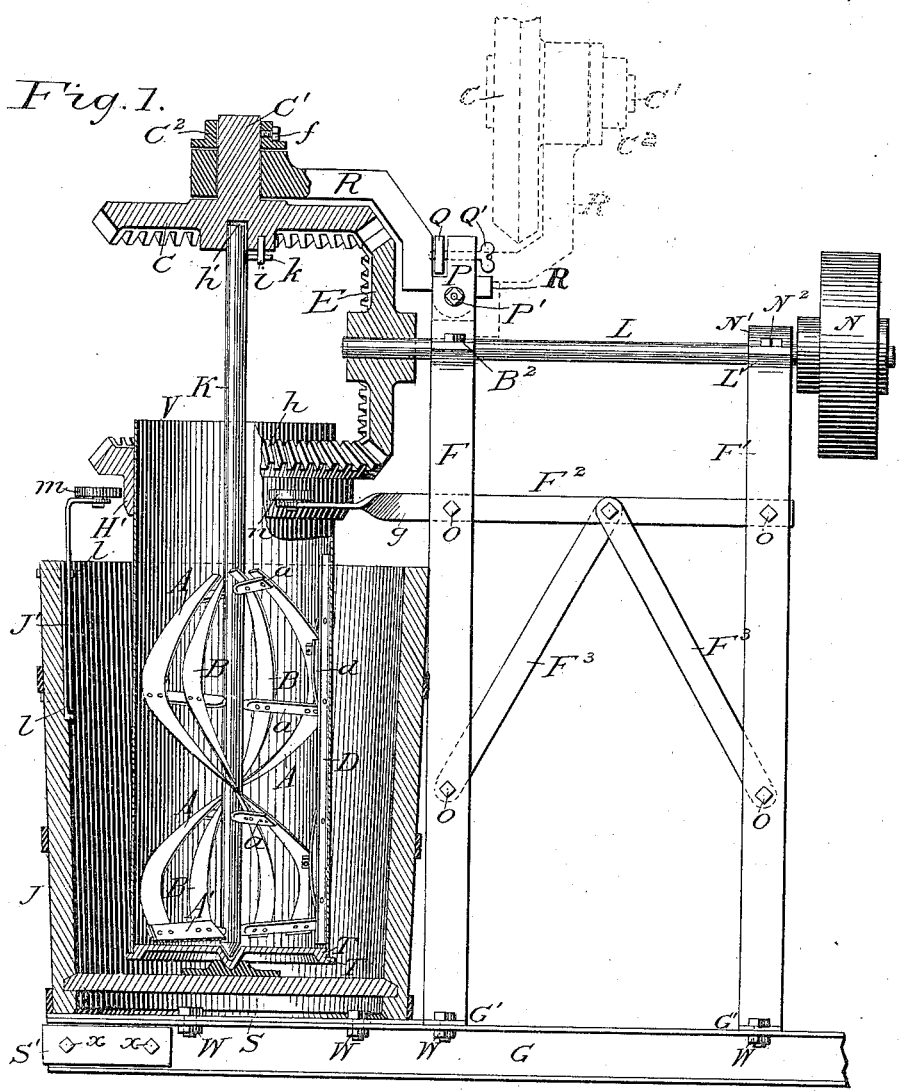
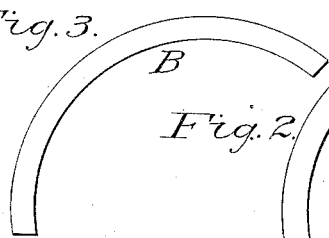
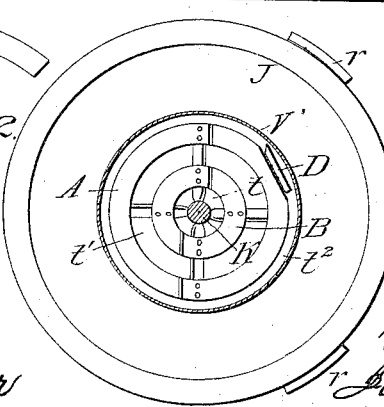
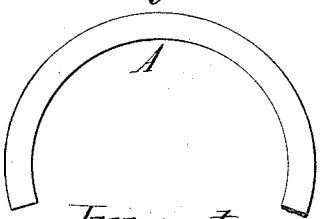
Witnesses:
J. P. Gantt
J. M. Weaver
Inventors.
Theophilus Weaver,
John F. Mayer,
By the former as Atty.

(No Model.) 2 Sheets—Sheet 2.
T. WEAVER & J. F. MAYER.
ICE CREAM FREEZER.
No. 309,177. Patented Dec. 9, 1884.
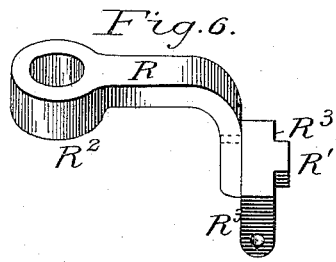
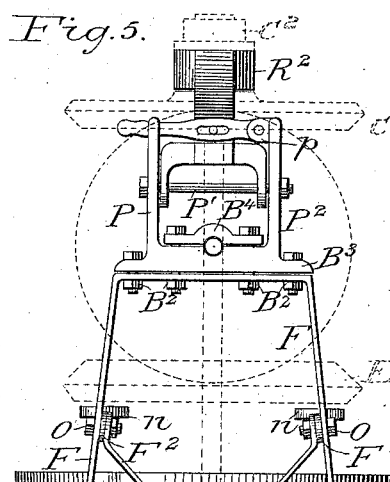
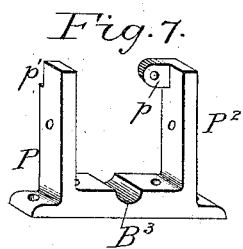
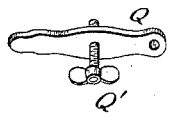
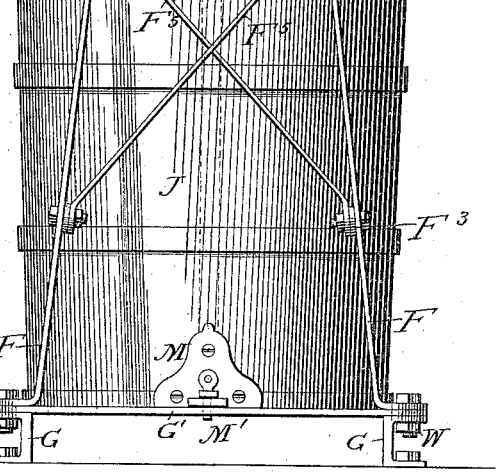
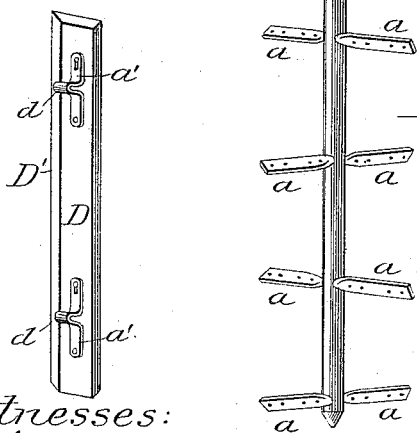

United States Patent Office.

THEOPHILUS WEAVER AND JOHN F. MAYER, OF HARRISBURG, PA., ASSIGNORS OF ONE-THIRD TO DAVID F. JAUSS, OF SAME PLACE.

ICE-CREAM FREEZER.

SPECIFICATION forming part of Letters Patent No. 309,177, dated December 9, 1884.

Application filed June 4, 1884. (No model.)

*To all whom it may concern:*

Be it known that we, THEOPHILUS WEAVER and JOHN F. MAYER, both citizens of the United States, residing at Harrisburg, in the county of Dauphin and State of Pennsylvania, have invented certain new and useful Improvements in Ice-Cream Freezers; and we hereby declare that the following is a full, clear, and exact description of the invention, which will enable others skilled in the arts to which it appertains to make and use the same.

The objects of our invention are to provide mechanism to make ice-cream equal in quantity and quality to hand-made cream, and with greater facility; and its aim is to admit air freely to the cream in the process of freezing, as in the hand-freezers, by having the cream-holder fully open at top, and by working the cream upward by rotary-beater action by means of a dasher armed with extensive spiral beaters thereon, sweeping thereby the cream upward in annular column or columns with vacant annular interstices or vortices centerward from the raised portions, thus creating a constant centerward and downward flow of the cream from the raised portions on said beaters, and not only introducing air, but exposing the cream extensively on the cream-holder wall, where the freezing occurs, to expedite the freezing, and lightening the mass after the freezing has reached a certain stage. We also employ superior mechanism for gearing and disgearing the parts, producing the contrary rotary motions of cream-holder and dasher, and superior cream-holder and scraper therefor.

Relative to the fixed annular gear upon the cream-holder, our device is an improvement on the patent of the first-named applicant, dated March 26, 1872, and numbered 124,992.

The novel and useful features of our invention are, first, a cream-holder for ice-cream freezers having firmly attached to its open end an annular gear of equal opening with that of said holder, having a collar beneath the circle of teeth thereon for a bearing against anti-friction rollers for guiding the said holder in the ice-holder; second, a rotary dasher having its beaters arranged as a skeleton screw made of two or more continuous spiral blades extended from the part next the bottom of the cream-holder to the part sweeping the upper area of the same, attached firmly to radial arms projected from the actuating shaft or spindle thereof and spaced duly therefrom to constitute a braced frame having annular open spaces between said shaft and said blades, adapted to let the cream descend through them after having been elevated on said blades; third, in combination with a rotary dasher having continuous spiral beaters supported on a series of radial arms projected at quarter-turns from its actuating-shaft, and off therefrom, a vertical scraper for removing the frozen cream as formed on the cream-holder wall, the same being attached to said beaters in a peculiar manner; fourth, the combination of bevel-wheel for dasher, a vertically-swinging bracket supporting it, a pivoted lock-bar holding said bracket in position, and adjusting-screw on said bar; fifth, the combination of re-bent uprights of machine-frame, holder for hinged bracket, and lock-bar therefor, driver-shaft, and bevel-gears, all connected with the freezer in manner to propel the cream-holder and dasher with contrary motions, and be disgearable without dissevering other parts; sixth, the combination of machine-frame uprights, sills of channel-iron, cross-braces and supports for ice-holder and cream-holder, adapted and arranged as hereinafter set forth.

In the accompanying drawings, Figure 1 represents a side elevation of our freezer-frame, dasher, hinged bracket, and base, the ice-holder, the cream-holder, and bevel-wheels being shown in section or broken away. Fig. 2 represents a top view of ice-holder and transverse section of cream-holder and dasher. Figs. 3 and 4 represent, respectively, the inner and the outer blades of the dasher in blank form. Fig. 5 represents an end elevation of machine-frame and ice-holder, the cream-holder and bevel gear-wheels being only indicated. Figs. 6, 7, 8, 9, and 10 represent perspective views, respectively, of the hinged bracket, the bracket-holder, the bracket lock-bar, the dasher-spindle, and the scraper.

Similar letters denote similar parts in all the views.

A B *a* K denote the dasher. A A denote the outer spiral beaters, and B B denote the inner spiral beaters thereof prolonged, with regular windage to extend from near the bottom T T' of cream-holder V to its upper part.

Letter $a$ denotes radial arms screwed or fixed in the dasher-spindle K, spaced about a quarter-turn from each other, as shown.

The spiral beaters A B are conveniently formed first into blanks, as shown in Figs. 3 and 4, and in that form surfaced and provided with holes for rivets. The strips are then sprung or curved laterally by a twist about three-quarters round, and in that condition riveted to the radial arms $a$ in such manner as to leave annular spaces between the beaters B and the spindle K, and between the outer beaters, A, and the inner beaters, B. The rotary motion of the said spindle, armed with said beaters, co-operating with the contrary rotary motion of the cream-holder, causes the cream to be carried upward above the level of the same at rest in the path of the beaters, and to be lower centerward from the beaters—that is, in the annular interstices $t$ $t'$—thus causing the cream to fall from the beaters centerward and downward, and permitting air to rush down behind the beaters to bottom of the cream-holder. A constant circulation is thus kept up from the center outward and upward on the beaters, and thence centerward above from the crest of the raised portion. Said circulation avoids buttering at spindle, exposes the cream extensively on the freezing-surface or inner wall of the cream-holder, and consequently expedites the freezing, favors the expulsion of gases or animal taint from the cream, and affords the best possible means for lightening or beating up the mass at the final stage of the freezing.

Across the foot ends of the adjacent beaters A B a slanting transverse scraper, A', is riveted thereto for clearing the bottom of the cream-holder of adhering particles and to assist said beaters in lifting the mass of cream. A vertical scraper, D, having sharp edge D', serves to scrape the frozen film from the wall of the cream-holder, it bearing against it by spring-pressure. Said scraper D is attached to the beaters A by buckling spring-fasteners $a'$, which are riveted to said scraper at their ends and are diverted or buckled intermediately. On their middle, between their sprung portions, are extensions $d$, by which the fasteners are riveted to the beaters A, a little in from the outer edges thereof.

Letters T T denote the cream-holder bottom, which is a casting with level upper surface, except a depression or bearing for spindle K, the same having its margin rabbeted at T' to allow the sheet of cylinder V to extend down below said top surface. That the cream-holder may be readily removed from the ice in the ice-holder without dragging it up, the flange T' on said bottom is made to come flush with exterior of the cylinder V. The annular gear H is fixedly attached at or near the upper end of cream-holder V, and has in it an opening large enough to fit around said cylinder, and the latter may be made to project several inches through the former. Said gear is provided with a collar, H', massed thereon below its circle of teeth $h$. Said collar protects said cylinder by serving as a bearing thereon for the anti-friction rollers $m$ $n$, by which the cream-holder is supported vertically in right position to gear with bevel-wheel E and have the dasher central in it. Said roller $m$ is pivoted on the removable post J', which latter is inserted into holds $l$ on plate on ice-holder J. The other anti-friction rollers, $n$, equidistant from the roller $m$, are oppositely supported on extensions $g$ of the braces $F^2$ of the machine-frame F F' $F^2$ $F^3$. When the ice-holder J is in position on platform S, against ledges $r$ thereon, and the pin M' or its equivalent is inserted through a clip, M, on said holder and through cross-bar G' or its equivalent, said rollers $m$ $n$ then bear against said collar H' on annular gear H, as shown, to maintain the cream-holder in erect position independently of the dasher. Said cream-holder is pivoted in the ice-holder in the usual way, as shown. The dasher-spindle K is supported at top in bevel-wheel C, by which it is driven, through intermediate bevel-wheel, E, to have contrary motion to that of the cream-holder V. Said spindle K is loosely fitted into a socket, $h'$, in the axis of wheel C, and need be guided only laterally thereby, as the action of the spiral beaters serves to keep it down. Said spindle has on it the transverse projection $k$, which bears against a projection, $i$, on said wheel to communicate its motion to the spindle and to permit disgearing them by a vertical lift of said wheel C, which is journaled at C' to bracket R and retained in its bearing by collar $C^2$ or its equivalent. Said bracket R is hinged to the holder or chair P $P^2$ $B^3$ through lugs $R^3$, as shown. It is thus attached that it may swing vertically, and, in connection with it, lift wheel C off said spindle K, and at the same time disgear it from wheel E without dissevering the connected parts, and, when disgeared, that said wheel C may stand out of the way for removing the dasher from the cream-holder. An extension, R', on said bracket stops it when in elevated position, it setting against the cap $B^4$ on base $B^3$, as shown. To lock said bracket while in position for gearing the wheels C and E, the lock-bar Q, pivoted to post $P^2$, is made to latch or bar the space between the posts P $P^2$ and said bracket, and to keep set against the latter by means of the adjusting-screw Q', whose point travels in a seat in the bracket, thus locking the bar and securing the bracket in braced position at the same time. The holder P $P^2$ $B^3$ is mounted on the top of the frame F, and its base $B^3$ has in it front bearing for main shaft L. Bolts $B^2$ secure journal-cap $B^4$, base $B^3$, and frame F together, as shown.

The machine-frame consists of similar uprights, F F', connected together by horizontal braces F², and cross bars or ties G', and the diagonal braces F³ and F⁵, all arranged and bolted or riveted together, as shown. The front bearing-cap, N', is secured to frame F' through pillow-block L', constituting the rear bearing for shaft L. The pulley N may be arranged between the frames F F', and shaft L may be extended and connected with mechanism to run another freezer at its other end.

The base consists of channel-irons G, set on edge, connected at ends by braces S', bolted thereto at $x$, connected above by platform S, of cast-iron, bolted thereto through flanges at $w$, and also connected above by the ties G', interposed between them and the feet of frames F F', and bolted therewith together at $w$. The machine-frame and the base thereof are of wrought-iron, except the platform S, which is perforated or a grating on top. (Not shown.)

We claim—

1. In an ice-cream freezer, in combination with annular gear attached firmly to upper part of cream-cylinder for driving the same, the vertical extension or collar adapted to embrace said cylinder and protect it by serving as a bearing for anti-friction rollers or other guides for holding it erect while being rotated, substantially as set forth.

2. For an ice-cream freezer, a rotary spiral-bladed dasher having its spiral beater or beaters arranged to sweep annular paths in from the cream-cylinder wall and out from the dasher-spindle, and adapted to elevate the cream on said beaters by the forward movement and permit its descent only centerward, substantially as and for the purposes set forth.

3. For an ice-cream-freezer, a rotary spiral-bladed dasher having its spiral beaters supported on radial arms projected from the dasher-spindle and arranged to sweep annular paths in the mid-space in cream-holder between said spindle and a line sufficient for clear sweep, away from cream-holder wall, in combination with vertical scraper held flatwise presented against said wall by buckling spring-fasteners attached to it and to rigid projections of or on said dasher, substantially as set forth.

4. In an ice-cream freezer, the rotary dasher having spindle K, provided with the radial arms $a$, inserted into it by screw or tenon on them at quarter-turns about its axis, and having the spiral beaters A B, riveted to said arms, and arranged to leave annular interstices $t\ t'$ clear through the dasher, in combination with the knife-edged scraper D, attached to two beater-blades, A, by a buckling spring-fastener, $a'\ d$, riveted to each and to it, and with scraper A' for bottom of cream-holder attached to said beaters, all adapted for operation in a rotary cream-holder, V, substantially as set forth.

5. In an ice-cream freezer, the combination of bevel-wheel adapted to couple with top of dasher-spindle, a vertically-swinging bracket having said wheel attached thereto, an adjustable lock-bar for stopping said bracket when said wheel is in geared position, and means for adjusting, as set-screw, for retaining said bar and releasing it, substantially as and for the purposes set forth.

6. In an ice-cream freezer, the combination of the rotary dasher-spindle K, the swinging bracket R, the wheel C, journaled thereto, and communicating with said spindle by loose-fitting socket and detents $i\ k$, the bracket-holder P P² B³, and the lock-bar Q, provided with set-screw Q', all adapted for gearing and disgearing the dasher, substantially as set forth.

7. In an ice-cream freezer having a rotary cream-holder, V, supported independently of the rotary dasher therein, by means of annular gear H, provided with the collar H', massed thereon, and firmly attached on outer surface of said holder, to favor its being left entirely open at top, in combination with the guiding anti-friction rollers $n$, permanently supported on extensions $g$ on the machine-frame, and roller $m$, removably supported on detachable post J', set in holds $l$, affixed to ice-holder J, with the latter placed substantially as and for the purposes set forth.

8. In an ice-cream-freezer-machine frame, the uprights F F', braced together, and with cross-ties G', bolted to channel-irons I, substantially as and for the purposes set forth.

THEOPHILUS WEAVER.
JOHN F. MAYER.

In presence of—
I. M. WIESTLING,
D. A. MAURER.